United States Patent
Suzuki et al.

[11] Patent Number: 5,864,421
[45] Date of Patent: Jan. 26, 1999

[54] OPTICAL FREQUENCY SHIFTER AND OPTICAL SOLITON-LIKE RETURN-TO-ZERO PULSE TRANSMISSION SYSTEM USING OPTICAL FREQUENCY SHIFTER

[75] Inventors: Masatoshi Suzuki, Kawajima-machi; Noboru Edagawa, Higashimatsuyama; Itsuro Morita, Wako; Shu Yamamoto, Shiki; Shigeyuki Akiba, Tokyo, all of Japan

[73] Assignee: Kokusai Denshin Denwa Kabushiki-Kaisha, Tokyo, Japan

[21] Appl. No.: 864,192

[22] Filed: May 28, 1997

[30] Foreign Application Priority Data

May 28, 1996 [JP] Japan .................................. 8-133819

[51] Int. Cl.⁶ .................................................. H04B 10/02
[52] U.S. Cl. .......................... 359/331; 359/161; 359/174; 359/326
[58] Field of Search ...................... 359/154, 161, 359/173, 174, 179, 326–332; 385/7, 10, 24

[56] References Cited

U.S. PATENT DOCUMENTS

| | | | |
|---|---|---|---|
| 4,852,106 | 7/1989 | Hino et al. | 359/326 X |
| 5,007,694 | 4/1991 | Yamamoto et al. | 359/326 |
| 5,523,874 | 6/1996 | Epworth | 359/161 |
| 5,629,795 | 5/1997 | Suzuki et al. | 3359/161 X |
| 5,648,976 | 7/1997 | Franck et al. | 372/25 |

*Primary Examiner*—John D. Lee
*Attorney, Agent, or Firm*—Banner & Witcoff Ltd

[57] ABSTRACT

An optical frequency shifter which has no insertion loss polarization dependency and no polarization mode dispersion is formed by: at least one ultrasonic wave generator for generating ultrasonic waves; at least one electric acousto-optic element forming at least one diffraction grating therein upon being applied with the ultrasonic waves generated by the ultrasonic wave generator; at least one polarization rotator for rotating a polarization plane of a first primary diffracted light produced by the diffraction grating, by 90°; and a light path through which an input light is entered into the electric acousto-optic element at a Bragg angle of the diffraction grating in a prescribed direction side, the prescribed direction being defined as either identical or opposite to a propagation direction of the ultrasonic waves, so that the first primary diffracted light is produced by the diffraction grating from the input light, a polarization plane rotated light produced by the polarization rotator is entered into the electric acousto-optic element at a Bragg angle of the diffraction grating in the prescribed direction side, and a second primary diffracted light produced by the diffraction grating from the polarization plane rotated light is outputted as an output light. An optical soliton-like return-to-zero pulse transmission system using a combination of this optical frequency shifter and a fixed optical filter in an optical amplifier repeater is also disclosed.

24 Claims, 9 Drawing Sheets

OPTICAL FREQUENCY SHIFTER AND OPTICAL SOLITON-LIKE RETURN-TO-ZERO PULSE TRANSMISSION SYSTEM USING OPTICAL FREQUENCY SHIFTER

BACKGROUND OF THE INVENTION

1. Field of the Invention

The present invention relates to an optical frequency shifter using an electro-acoustic effect which has no insertion loss polarization dependency and no polarization mode dispersion, and to an optical soliton-like RZ (Return-to-Zero) pulse transmission system using such an optical frequency shifter which is suitable for an application to the optical submarine cables.

2. Description of the Background Art

The conventional optical frequency shifter using an electro-acoustic effect has a large insertion loss polarization dependency of about 0.5 dB for example, and a large polarization mode dispersion of about 10 ps delay for example, so that the conventional optical frequency shifter has been associated with a problem that the waveform deformation is caused for the high speed signals in random polarization states.

On the other hand, as a transmission system capable of realizing a very large capacity optical communication, there is an optical soliton transmission system using optical soliton pulses. In this optical soliton transmission system, an optical amplifier system using optical soliton pulses has various advantages over the usual optical amplifier system using non-return-to-zero pulses such as that a large capacity can be realized, that a multiplexing can be realized easily, and that there is a little degradation due to the non-linearity because the non-linearity of the optical fibers is utilized. For these reasons, the optical soliton transmission system has been studied very actively.

In the optical soliton communication, the optical amplifier noise affects the timing jitter of the optical pulses at a receiving terminal, and degrades the transmission characteristic. Namely, in the optical soliton to which the noise is superposed, there is a random jitter in the optical intensity and a shape of the optical soliton is slightly deformed from the ideal optical soliton shape, so that there arises a jitter in an amount of carrier frequency shift due to the non-linear optical effect. As this effect is repeated by repeaters, a random jitter in arrival times of the optical pulses is caused while the optical pulses are propagated through an optical fiber with a finite dispersion value. This phenomenon is called the Gordon Haus effect, which has been the major limitation of the transmission characteristic for the optical soliton communication.

In a case of transmitting a plurality of optical solitons having data, a shape of each soliton is not changed but adjacent solitons interfere with each other if an interval between adjacent solitons is narrow so that it is possible to observe a phenomenon in which adjacent solitons attract each other or repel each other. Such a phenomenon also causes a timing jitter at a receiving terminal, so that it is not desirable from a viewpoint of the application to the communication. In order to suppress the interference of the solitons, there is a need to provide a sufficiently wide interval between adjacent solitons.

In order to overcome the above described timing jitter, there have been active researches on the soliton control techniques for suppressing the timing jitter artificially, and the soliton transmission experiments have made rapid progresses in recent years. One available soliton control technique is a technique for controlling the random frequency shift in the frequency region by using the optical filter, and another available soliton control technique is a technique for directly controlling the timing jitter itself in the time region.

The control in the frequency region suppresses the timing jitter by bringing the random frequency shift which causes the timing jitter closer to the central frequency of the filter by using the optical narrow bandwidth band-pass filter provided behind the optical amplifier. This filter is called a frequency guiding filter as it guides the solitons which tend to move away from the center in the frequency region. The bandwidth of the filter is as narrow as 5 to 10 times the spectrum width of the soliton. Also, the noises will be accumulated in the frequency guiding with the fixed central frequency, so that there is a proposition of a method for slightly sliding the central frequency of the optical filter along distances, and such a filter is called a sliding frequency guiding filter.

This method is based on the principle that, the soliton components are non-linear waves that propagate while generating the frequency chirp by themselves so that the soliton components follow a slight change of the central frequency of the filter, but the noise components are linear waves which do not follow the filter frequency shift, so that the noise components are gradually set outside the filter bandwidth and the noise accumulation can be suppressed effectively. An amount for sliding the central frequency is approximately −6 GHz for 1000 km.

However, it is very difficult to apply these narrow bandwidth filters to the practical system for the following reason. Namely, the frequency of lights is approximately 200 THz but there is a need to shift an absolute value of the central frequency of the filter by about 200 MHz (which amounts to an accuracy of 0.0001% with respect to the central frequency) at each repeater in a case of the sliding frequency guiding filter, for example. However, in view of the current technological level and the environmental change such as a temperature change associated with the practical system, it is expected that such a minute control of the narrow bandwidth optical filter is nearly impossible in the practical system.

Also, when the application of the optical soliton communication to the optical submarine cables is taken into account, the conventional technique which requires a use of a very narrow bandwidth optical filter inside the repeater is not preferable because the repeater is required to have a high reliability from a practical viewpoint of the long term system reliability.

On the other hand, it is known that the effect effectively equivalent to the sliding frequency filter can be obtained by providing a frequency shifter and a fixed optical filter inside the repeater. In this case, the noises are set outside the bandwidth of the optical filter by the frequency shifter, but the optical solitons are trapped by the central frequency of the fixed filter.

However, the conventional frequency shifter has a large insertion loss polarization dependency and a large polarization mode dispersion so that there has been a problem that the conventional frequency shifter cannot be used in the practical system.

SUMMARY OF THE INVENTION

It is therefore an object of the present invention to provide an optical frequency shifter which has ideal properties of having no insertion loss polarization dependency and no polarization mode dispersion.

It is another object of the present invention to provide a very large capacity wavelength multiplexing optical soliton-like RZ pulse transmission system using the optical frequency shifter of the present invention, which is capable of improving the soliton-like RZ pulse transmission characteristic.

Note that, in the following description, an optical soliton transmission system can be generalized into an optical soliton-like RZ pulse transmission system for a case of handling soliton-like RZ pulses which are not necessarily solitons in the strict sense.

According to one aspect of the present invention there is provided an optical frequency shifter, comprising: a ultrasonic wave generator for generating ultrasonic waves; an electric acousto-optic element forming a diffraction grating therein upon being applied with the ultrasonic waves generated by the ultrasonic wave generator; an input light path for entering an input light into the electric acousto-optic element at a Bragg angle of the diffraction grating in a prescribed direction side, the prescribed direction being defined as either identical or opposite to a propagation direction of the ultrasonic waves; a polarization rotator for rotating a polarization plane of a first primary diffracted light produced by the diffraction grating from the input light, by 90°; a reflection mechanism for entering a polarization plane rotated light produced by the polarization rotator into the electric acousto-optic element at a Bragg angle of the diffraction grating in the prescribed direction side; and an output light path for outputting a second primary diffracted light produced by the diffraction grating from the polarization plane rotated light, as an output light.

According to another aspect of the present invention there is provided an optical frequency shifter, comprising: a first ultrasonic wave generator for generating ultrasonic waves; a first electric acousto-optic element forming a first diffraction grating therein upon being applied with the ultrasonic waves generated by the first ultrasonic wave generator; an input light path for entering an input light into the first electric acousto-optic element at a Bragg angle of the first diffraction grating in a prescribed direction side with respect to the ultrasonic waves generated by the first ultrasonic wave generator, the prescribed direction being defined as either identical or opposite to a propagation direction of the ultrasonic waves; a polarization rotator for rotating a polarization plane of a first primary diffracted light produced by the first diffraction grating from the input light, by 90°; a second ultrasonic wave generator for generating ultrasonic waves; a second electric acousto-optic element forming a second diffraction grating therein upon being applied with the ultrasonic waves generated by the second ultrasonic wave generator, into which a polarization plane rotated light produced by the polarization rotator is entered at a Bragg angle of the second diffraction grating in the prescribed direction side with respect to the ultrasonic waves generated by the second ultrasonic wave generator; and an output light path for outputting a second primary diffracted light produced by the second diffraction grating from the polarization plane rotated light, as an output light.

According to another aspect of the present invention there is provided an optical frequency shifter, comprising: at least one ultrasonic wave generator for generating ultrasonic waves; at least one electric acousto-optic element forming at least one diffraction grating therein upon being applied with the ultrasonic waves generated by said at least one ultrasonic wave generator; at least one polarization rotator for rotating a polarization plane of a first primary diffracted light produced by said at least one diffraction grating, by 90°; and a light path through which an input light is entered into said at least one electric acousto-optic element at a Bragg angle of said at least one diffraction grating in a prescribed direction side, the prescribed direction being defined as either identical or opposite to a propagation direction of the ultrasonic waves, so that the first primary diffracted light is produced by said at least one diffraction grating from the input light, a polarization plane rotated light produced by said at least one polarization rotator is entered into said at least one electric acousto-optic element at a Bragg angle of said at least one diffraction grating in the prescribed direction side, and a second primary diffracted light produced by said at least one diffraction grating from the polarization plane rotated light is outputted as an output light.

According to another aspect of the present invention there is provided an optical soliton-like return-to-zero pulse transmission system for transmitting wavelength multiplexed optical soliton-like return-to-zero pulses; comprising: a plurality of return-to-zero pulse transmitters for generating optical soliton-like return-to-zero pulses in a plurality of different wavelengths; transmission optical fibers for transmitting the optical soliton-like return-to-zero pulses generated by the return-to-zero pulse transmitters; a plurality of optical receivers for receiving the optical soliton-like return-to-zero pulses transmitted through the transmission optical fibers; and a plurality of optical amplifier repeaters to be inserted into the transmission optical fibers at a prescribed repeater interval, for compensating a loss of the transmission optical fibers, at least one optical amplifier repeater including: a fixed optical filter having a prescribed light transmission characteristic with respect to said plurality of different wavelengths, which is provided at an output side of said at least one optical amplifier repeater; and an optical frequency shifter having no insertion loss polarization dependency and no polarization mode dispersion, which is provided at an input side of the fixed optical filter.

Other features and advantages of the present invention will become apparent from the following description taken in conjunction with the accompanying drawings.

DETAILED DESCRIPTION OF THE PREFERRED EMBODIMENTS

Figure 1:
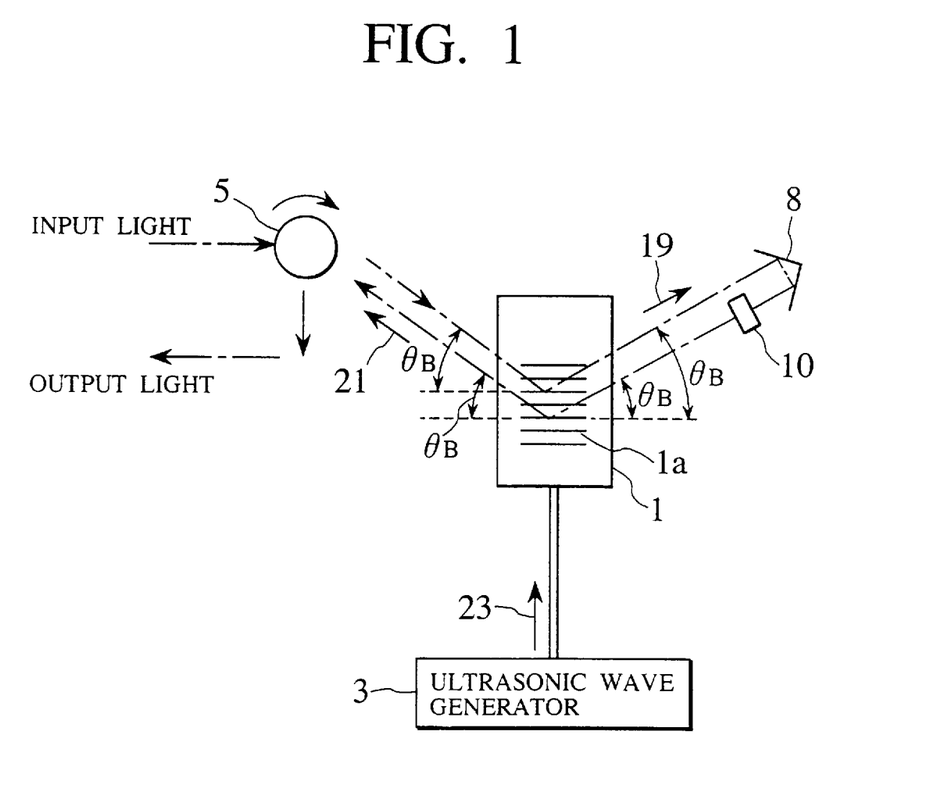
FIG. 1 is a block diagram showing a configuration of the first embodiment of an optical frequency shifter according to the present invention.

Referring now to FIG. 1, the first embodiment of an optical frequency shifter according to the present invention will be described in detail.

FIG. 1 shows a configuration of an optical frequency shifter in this first embodiment, which has an electric acousto-optic element 1 made of a monocrystal $PbMoO_4$ for example, and an ultrasonic wave generator 3 connected to one end of the electric acousto-optic element 1. This ultrasonic wave generator 3 generates ultrasonic waves of a frequency $f_0$ which are to be applied to and propagated through the electric acousto-optic element 1 in a direction indicated by an arrow 23. When the ultrasonic waves are applied, the electric acousto-optic element 1 changes its refractive index periodically, so as to form a diffraction grating 1a therein as indicated in FIG. 1.

In this optical frequency shifter of FIG. 1, an input light of a frequency f is entered through an optical circulator 5 into the electric acousto-optic element 1, at the Bragg angle $\theta_B$ of the diffraction grating 1a. Then, this input light is diffracted at the Bragg angle $\theta_B$ by the diffraction grating 1a into the same direction as a propagation direction of the ultrasonic waves from the ultrasonic wave generator 3, and propagates toward a corner mirror 8 as a primary diffracted light 19.

Note here that by entering the input light into the diffraction grating 1a of the electric acousto-optic element 1 at the Bragg angle $\theta_B$, the primary diffracted light 19 is generated only at the same Bragg angle $\theta_B$. This Bragg angle $\theta_B$ can be expressed by the following expression:

$$\theta_B = \sin^{-1}(\lambda/2\Lambda) \approx \lambda f/2v$$

where $\lambda$ is a wavelength of the input light, $\Lambda$ is a wavelength of the ultrasonic waves, f is a frequency of the ultrasonic waves, and v is a speed of sound.

The primary diffracted light 19 is diffracted by the diffraction grating 1a of the electric acousto-optic element 1 into the same direction as the propagation direction of the ultrasonic waves so that the frequency of the primary diffracted light 19 becomes $f+f_0$ due to the Doppler effect.

The primary diffracted light 19 diffracted by the diffraction grating 1a and propagated toward the corner mirror 8 is then totally reflected by 90° twice at the corner mirror 8, and propagates toward a direction opposite to the propagation direction of the primary diffracted light 19 and passes through a Faraday rotator 10.

The light passing through the Faraday rotator 10 has its polarization plane rotated by 90°, and this light with the 90° rotated polarization plane is then entered into the electric acousto-optic element 1 again at the Bragg angle $\theta_B$ of the diffraction grating 1a, from a direction which is parallel but opposite to the direction of the primary diffracted light 19.

The light entered into the electric acousto-optic element 1 again is then diffracted at the Bragg angle $\theta_B$ by the diffraction grating 1a of the electric acousto-optic element 1 as a primary diffracted light 21.

This primary diffracted light 21 is in the same direction as the propagation direction of the ultrasonic waves so that the frequency of the primary diffracted light 21 becomes $(f+f_0)+f_0$ due to the Doppler effect, so that the frequency is shifted by $2f_0$ from the frequency f of the input light. This primary diffracted light 21 is then outputted through the optical circulator 5 as the output light.

As described above, the light which passed through the optical frequency shifter of FIG. 1 is outputted with its frequency shifted as much as twice the frequency of the ultrasonic waves due to the twice applied Doppler effect, and passes through the electric acousto-optic element 1 in a polarization state which is perpendicular to an original polarization state of the input light, so that the polarization dependency of the insertion loss and the polarization mode dispersion are both cancelled out and become nearly equal to zero.

According to the experiment conducted by the present inventors, it was confirmed that the polarization dependency of the insertion loss is reduced from 0.5 dB in the conventional optical frequency shifter to 0.01 dB in this optical frequency shifter of FIG. 1, and the polarization mode dispersion is also reduced from 10 ps in the conventional optical frequency shifter to below 0.1 ps in this optical frequency shifter of FIG. 1.

Consequently, according to this first embodiment, it is possible to provide an ideal optical frequency shifter which has properties of having no insertion loss polarization dependency and no polarization mode dispersion.

Figure 2:
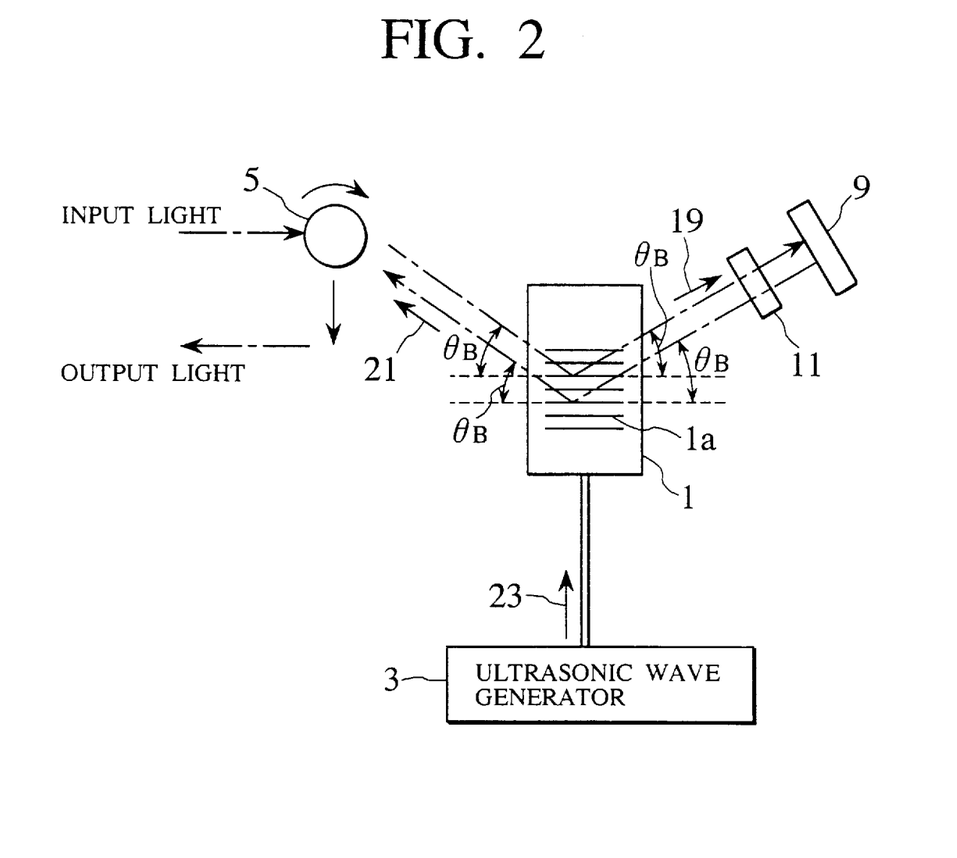
FIG. 2 is a block diagram showing a configuration of the second embodiment of an optical frequency shifter according to the present invention.

Referring now to FIG. 2, the second embodiment of an optical frequency shifter according to the present invention will be described in detail.

FIG. 2 shows a configuration of an optical frequency shifter in this second embodiment, which differs from the optical frequency shifter of FIG. 1 in that the a total reflection mirror 9 is provided instead of the corner mirror 8 of FIG. 1 and the 45° Faraday rotator 11 is provided instead of the 90° Faraday rotator 10 of FIG. 1 at such a position that the primary diffracted light 10 diffracted from the diffraction grating 1a passes through the 45° Faraday rotator twice so as to have its polarization plane rotated by 90° in total. The rest of the configuration of FIG. 2 formed by the electric acousto-optic element 1, the ultrasonic wave generator 3 and the optical circulator 5 is substantially the same as in the optical frequency shifter of FIG. 1.

In this optical frequency shifter of FIG. 2, when an input light of a frequency f is entered through the optical circulator 5 into the electric acousto-optic element 1 at the Bragg angle $\theta_B$ of the diffraction grating 1a, this input light is diffracted at the Bragg angle $\theta_B$ by the diffraction grating 1a into the same direction as the propagation direction of the ultrasonic waves from the ultrasonic wave generator 3, so as to pass through the Faraday rotator 11 as the primary diffracted light 19.

This primary diffracted light 35 is in the same direction as the propagation direction of the ultrasonic waves so that the frequency of the primary diffracted light 19 becomes $f+f_0$ due to the Doppler effect.

The primary diffracted light 19 has its polarization plane rotated by 45° after passing through the Faraday rotator 11, and this light with the 45° rotated polarization plane is then totally reflected by the total reflection mirror 9 into a direction which is parallel but opposite to that of the primary diffracted light 19, so as to pass through the Faraday rotator 11 again and have its polarization plane further rotated by 45° so that the polarization plane is rotated by 90° from the original polarization plane of the input light in effect.

This light with the total 90° rotated polarization plane is then entered into the electric acousto-optic element 1 again at the Bragg angle $\theta_B$ of the diffraction grating 1a, from a direction which is parallel but opposite to that of the primary diffracted light 19.

The light entered into the electric acousto-optic element 1 again is then diffracted at the Bragg angle $\theta_B$ by the diffraction grating 1a of the electric acousto-optic element 1 as a primary diffracted light 21.

This primary diffracted light 21 is in the same direction as the propagation direction of the ultrasonic waves so that the frequency of the primary diffracted light 21 becomes $(f+f_{518})+f_{518}$ due to the Doppler effect, so that the frequency is shifted by $2f_{518}$ from the frequency f of the input light. This primary diffracted light 21 is then outputted through the optical circulator 5 as the output light.

Similarly as in the first embodiment described above, the light which passed through the optical frequency shifter of FIG. 2 is outputted with its frequency shifted as much as twice the frequency of the ultrasonic waves due to the twice applied Doppler effect, and passes through the electric acousto-optic element 1 in a polarization state which is perpendicular to an original polarization state of the input light, so that the polarization dependency of the insertion loss and the polarization mode dispersion are both cancelled out and become nearly equal to zero.

According to the experiment conducted by the present inventors, it was confirmed that the polarization dependency of the insertion loss is reduced from 0.5 dB in the conventional optical frequency shifter to 0.01 dB in this optical frequency shifter of FIG. 2, and the polarization mode dispersion is also reduced from 10 ps in the conventional optical frequency shifter to below 0.1 ps in this optical frequency shifter of FIG. 2.

Consequently, according to this second embodiment, it is also possible to provide an ideal optical frequency shifter which has properties of having no insertion loss polarization dependency and no polarization mode dispersion.

Figure 3:
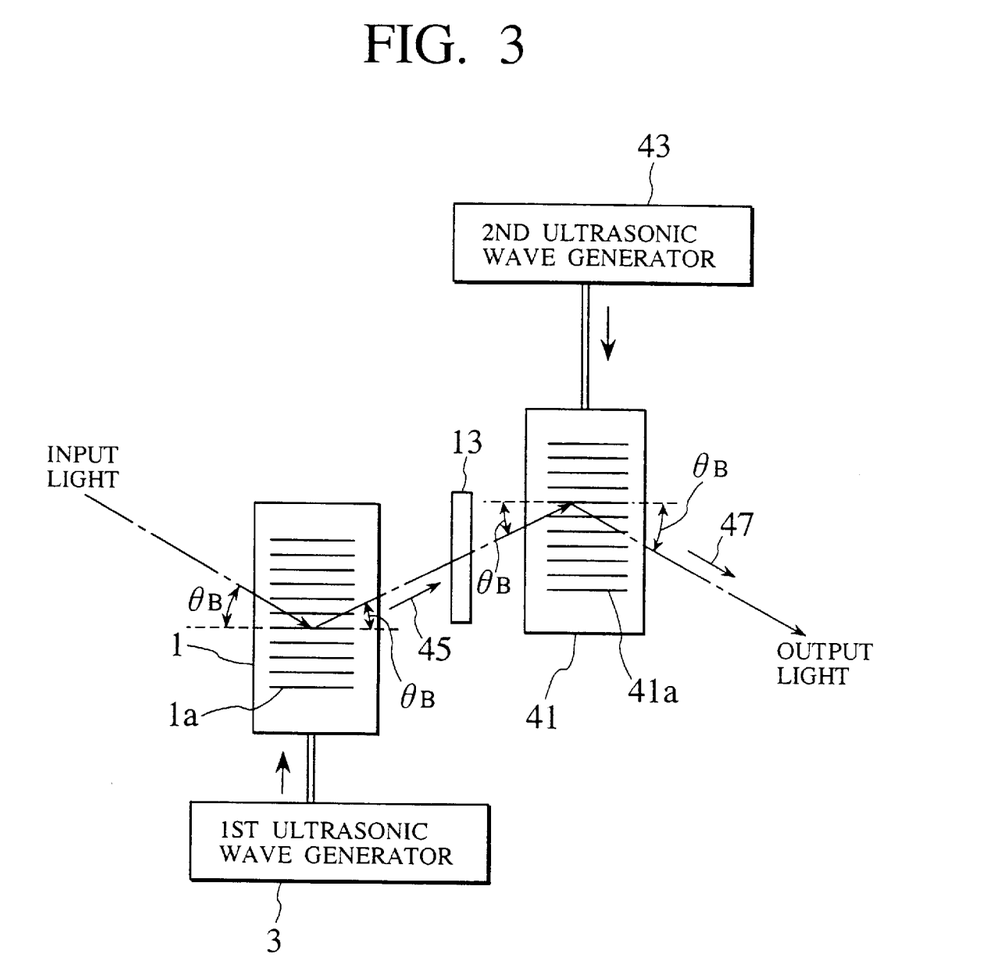
FIG. 3 is a block diagram showing a configuration of the third embodiment of an optical frequency shifter according to the present invention.

Referring now to FIG. 3, the third embodiment of an optical frequency shifter according to the present invention will be described in detail.

FIG. 3 shows a configuration of an optical frequency shifter in this third embodiment, which differs from the optical frequency shifter of FIG. 2 in that the total reflection mirror 9 of FIG. 2 is omitted while a second electric acousto-optic element 41 and a second ultrasonic wave generator 43 connected to the second electric acousto-optic element 41 are additionally provided, and the 45° Faraday rotator 11 of FIG. 2 is omitted while a 90° Faraday rotator 13 is provided at a position on the optical path between the first and second electric acousto-optic elements 1 and 41. The rest of the configuration of FIG. 3 formed by the first electric acousto-optic element 1 and the first ultrasonic wave generator 3 is substantially the same as in the optical frequency shifter of FIG. 1 or FIG. 2.

Here, it is assumed that the second ultrasonic wave generator 43 also generates ultrasonic waves of a frequency $f_\emptyset$ which are to be applied to and propagated through the second electric acousto-optic element 41 in a direction opposite to the propagation direction of the ultrasonic waves from the first ultrasonic wave generator 3.

In this optical frequency shifter of FIG. 3, when an input light of a frequency f is entered into the first electric acousto-optic element 1 at the Bragg angle $\theta_B$ of the diffraction grating 1a in the first electric acousto-optic element 1, this input light is diffracted at the Bragg angle $\theta_B$ by the diffraction grating 1a into the same direction as the propagation direction of the ultrasonic waves from the first ultrasonic wave generator 3, so as to pass through the Faraday rotator 13 as the primary diffracted light 45.

This primary diffracted light 45 is in the same direction as the propagation direction of the ultrasonic waves from the first ultrasonic wave generator 3 so that the frequency of the primary diffracted light 45 becomes $f+f_\emptyset$ due to the Doppler effect.

The primary diffracted light 45 has its polarization plane rotated by 90° after passing through the Faraday rotator 13, and this light with the 90° rotated polarization plane is then entered into the second electric acousto-optic element 41 at the Bragg angle $\theta_B$ of the diffraction grating 41a in the second electric acousto-optic element 41.

The light entered into the second electric acousto-optic element 41 is then diffracted at the Bragg angle $\theta_B$ by the diffraction grating 41a into the same direction as the propagation direction of the ultrasonic waves from the second ultrasonic wave generator 43, as a primary diffracted light 47.

This primary diffracted light 47 is in the same direction as the propagation direction of the ultrasonic waves from the second ultrasonic wave generator 43 so that the frequency of the primary diffracted light 47 becomes $(f+f_\emptyset)+f\emptyset$ due to the Doppler effect, so that the frequency is shifted by $2f_{518}$ from the frequency f of the input light. This primary diffracted light 47 is then outputted as the output light.

Similarly as in the first and second embodiments described above, the light which passed through the optical frequency shifter of FIG. 3 is outputted with its frequency shifted as much as twice the frequency of the ultrasonic waves due to the twice applied Doppler effect, and passes through the second electric acousto-optic element 41 in a polarization state which is perpendicular to an original polarization state of the input light, so that the polarization dependency of the insertion loss and the polarization mode dispersion are both cancelled out and become nearly equal to zero.

According to the experiment conducted by the present inventors, it was confirmed that the polarization dependency of the insertion loss is reduced from 0.5 dB in the conventional optical frequency shifter to 0.01 dB in this optical frequency shifter of FIG. 3, and the polarization mode dispersion is also reduced from 10 ps in the conventional optical frequency shifter to below 0.1 ps in this optical frequency shifter of FIG. 3.

Consequently, according to this third embodiment, it is also possible to provide an ideal optical frequency shifter which has properties of having no insertion loss polarization dependency and no polarization mode dispersion.

In addition, the optical frequency shifter of this third embodiment has a relatively simple structure, so that it is also possible to realize this optical frequency shifter with a relatively high reliability.

Note that the first to third embodiments of the optical frequency shifter described above have been directed to a case of diffracting the input light at the diffraction grating of the electric acousto-optic element twice into the same direction as the propagation direction of the ultrasonic waves, but it is also possible to modify these embodiments such that the input light is diffracted at the diffraction grating of the electric acousto-optic element twice into the direction opposite to the propagation direction of the ultrasonic waves, so as to shift the frequency by $-2f_\emptyset$.

It is also to be noted that the first to third embodiments of the optical frequency shifter described above can be modified by an obvious replacement of components, such as a use of two 45° Faraday rotators instead of one 90° Faraday rotator for example.

Figure 4:
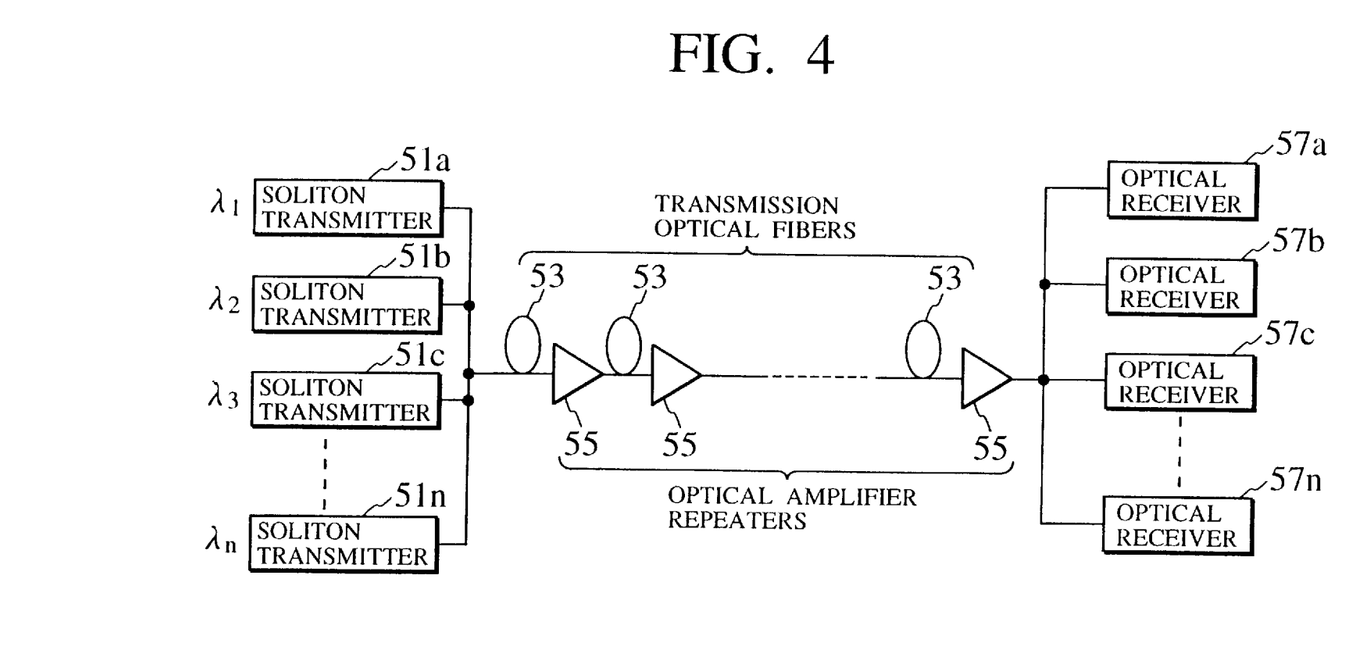
FIG. 4 is a block diagram showing a configuration of an optical soliton transmission system according to the resent invention.

Referring now to FIG. 4, an optical soliton-like RZ pulse transmission system according to the present invention in a form of an optical soliton transmission system will be described in detail.

The optical soliton transmission system of the present invention uses a fixed optical filter and the polarization independent optical frequency shifter of FIG. 1, FIG. 2 or FIG. 3 described above in its optical amplifier repeater, so that the noises are set outside the bandwidth of the optical filter by the optical frequency shifter, while the optical solitons are trapped by the central frequency of the fixed optical filter, so as to effectively realize the equivalent transmission characteristic as the sliding frequency filter.

In the wavelength multiplexing type optical soliton transmission system shown in FIG. 4, the soliton pulses in a plurality of wavelengths $\lambda 1$ to $\lambda n$ are generated from a plurality of 10 Gb/s soliton transmitters 51a to 51n respectively, propagated through transmission optical fibers 53 and a plurality of optical amplifier repeaters 55, and received by a plurality of 10 Gb/s optical receivers 57a to 57n respectively.

Figure 5:
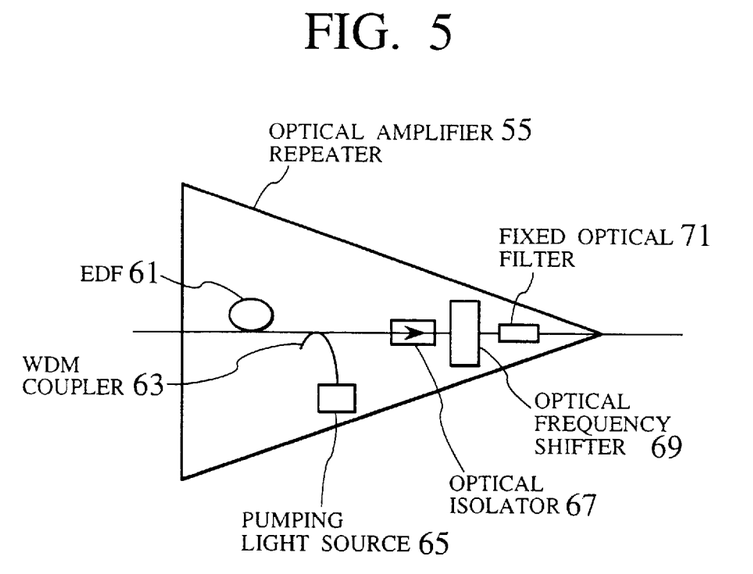
FIG. 5 is a block diagram showing a configuration of an optical amplifier repeater in the optical soliton transmission system of FIG. 4.
Figure 6:
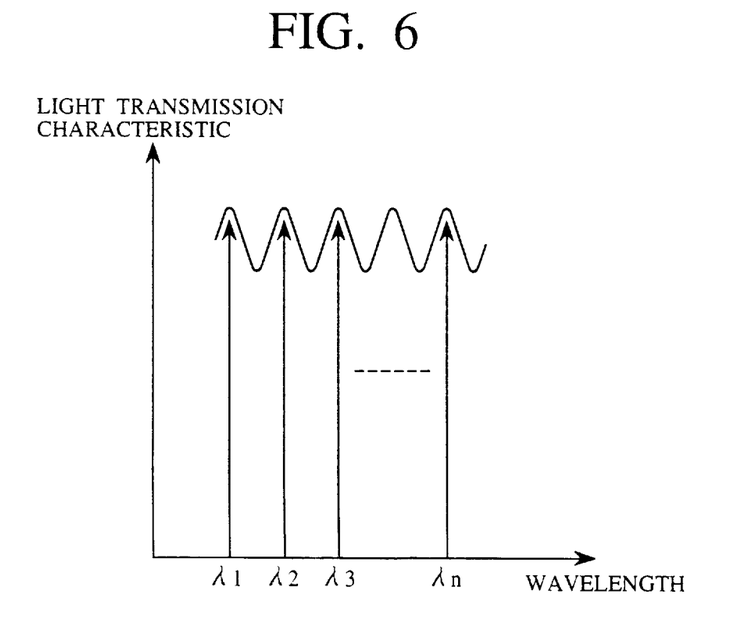
FIG. 6 is a graph showing a light transmission characteristic of a fixed optical filter in the optical amplifier repeater of FIG. 5.

Each optical amplifier repeater 55 has a detailed configuration as shown in FIG. 5, which comprises: an erbium-doped optical fiber (EDF) 61 provided at an input side of the optical amplifier repeater 55; a WDM (Wavelength Division Multiplexing) coupler 63 provided on an output side of the erbium-doped optical fiber 61; a pumping light source 65 connected to the WDM coupler 63, for amplifying the light signal propagated through the erbium-doped optical fiber 61 by supplying the pumping laser light into the erbium-doped optical fiber 61 through the WDM coupler 63; an optical isolator 67 connected to an output side of the WDM coupler 63, for blocking the reflected light from an output side of the optical amplifier repeater 55; an optical frequency shifter of FIG. 1, FIG. 2 or FIG. 3 which has no insertion loss polarization dependency and no polarization mode dispersion, and which is connected to an output side of the optical isolator 67; and a fixed optical filter 71 having a light transmission characteristic with respect to the wavelengths $\lambda 1$ to $\lambda n$ as indicated in FIG. 6, which is connected to an output side of the optical frequency shifter 69.

Note here that, in the light transmission characteristic of FIG. 6, each adjacent wavelengths are separated by an interval of 1 nm.

In this optical soliton transmission system of FIG. 4, the optical frequency shifter 69 which has no insertion loss polarization dependency and no polarization mode dispersion is provided in combination with the fixed optical filter 71 within each optical amplifier repeater 55, so that the noises are set outside the bandwidth of the fixed optical filter 71 by the optical frequency shifter 69, but the optical solitons are trapped by the central frequency of the fixed optical filter 71, so as to effectively realize the equivalent transmission characteristic as the sliding frequency filter. Consequently, it becomes possible to improve the soliton transmission characteristic and realize a very large capacity wavelength multiplexing optical soliton transmission system.

Now, as the first embodiment of the optical soliton transmission system according to the present invention, the configuration of FIG. 4 can be realized as follows.

Namely, a total n sets of the 10 Gb/s soliton transmitters 51a to 51n and a total 300 sets of the optical amplifier repeaters 55 in a configuration of FIG. 5 are provided at a repeater interval of 30 km, using a wavelength interval of 1 nm, over a total transmission distance of 9000 km. Then, an amount of frequency shift by the optical frequency shifter 69 is set equal to +160 MHz or −160 MHz from the 1st to 300th repeaters. The fixed optical filter 71 having the periodic light transmission characteristic as shown in FIG. 6 can be realized by a Fabry-Perot etalon having FSR (Free Spectral Range) equal to 1 nm and its endface light reflection set equal to about 10%.

As an exemplary implementation of this first embodiment, a number of the soliton transmitters 51 is set equal to two, the bit rate is set equal to 10 Gb/s (a pulse width (a full width at half maximum) of the transmission pulse is set equal to 15 ps), and the wavelengths of the transmitter outputs are set equal to 1558 and 1559 nm. Then, the output level of the optical amplifier repeater 55 is set equal to 0 dBm, the repeater interval is set equal to 30 km, and the optical fiber wavelength dispersion (an average value over the entire system) is set equal to 0.5 ps/km/nm (at 1559 nm).

Figure 7:
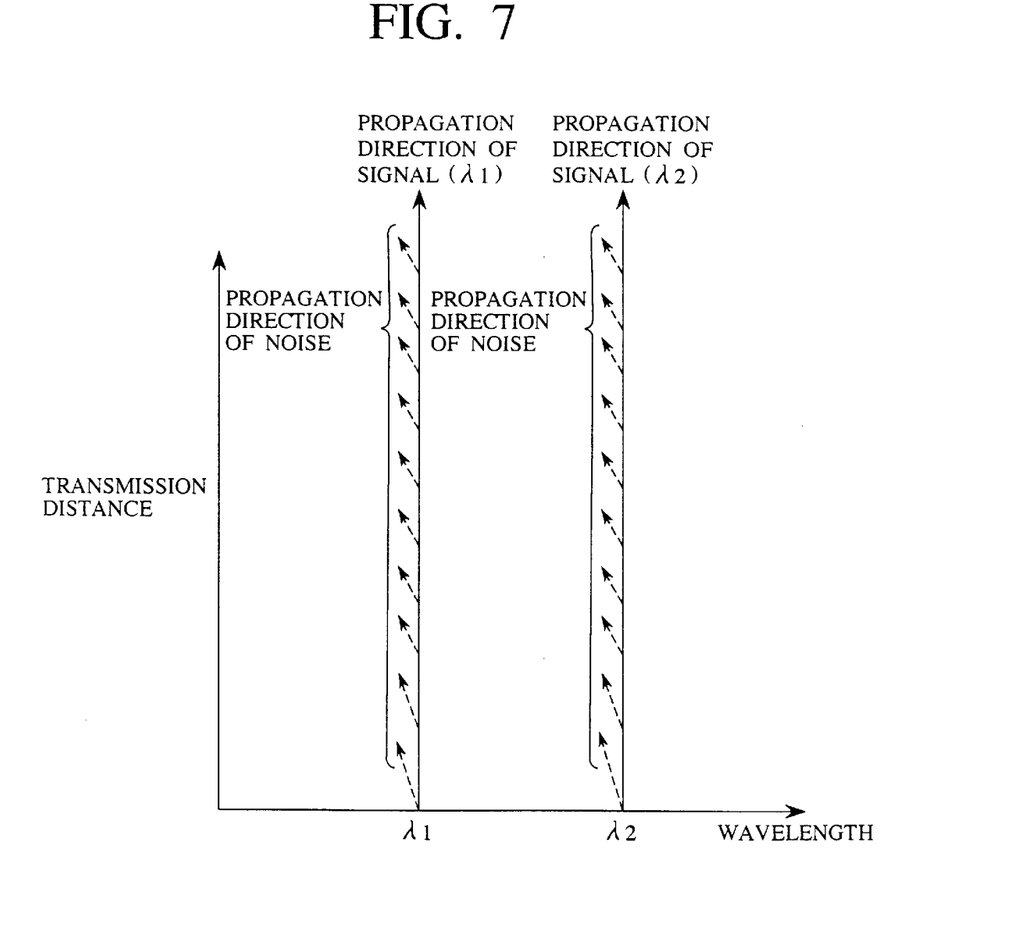
FIG. 7 is a diagram showing propagation directions of signal components and noise components in the first embodiment of an optical soliton transmission system according to the present invention.

In this case, it becomes possible to separate the signal component and the noise component at each optical amplifier repeater as indicated in FIG. 7, and the bit error rate below $10_{-9}$ can be achieved after the transmission over 9000 km for both wavelengths.

Next, as the second embodiment of the optical soliton transmission system according to the present invention, the configuration of FIG. 4 can be realized as follows.

Namely, a total n sets of the 10 Gb/s soliton transmitters 51a to 51n and a total 300 sets of the optical amplifier repeaters 55 in a configuration of FIG. 5 are provided at a repeater interval of 30 km, using a wavelength interval of 1 nm, over a total transmission distance of 9000 km. Then, an amount of frequency shift by the optical frequency shifter 69 is set equal to +320 MHz or −320 MHz from the 1st to 150th repeaters and to −320 MHz or +320 MHz from the 151th to 300th repeaters, so that the direction of the frequency shift is inverted at a center of the system. With this setting, it is possible to evenly distribute the noise components to a long wavelength side and a short wavelength side of the signal wavelength, so that it becomes possible to prevent the noises from being introduced into the adjacent channel and therefore it becomes possible to further improve the transmission characteristic.

As an exemplary implementation of this second embodiment, a number of the soliton transmitters 51 is set equal to two, the bit rate is set equal to 10 Gb/s (a pulse width (a full width at half maximum) of the transmission pulse is set equal to 15 ps), and the wavelengths of the transmitter outputs are set equal to 1558 and 1559 nm. Then, the output level of the optical amplifier repeater 55 is set equal to 0 dBm, the repeater interval is set equal to 30 km, and the optical fiber wavelength dispersion (an average value over the entire system) is set equal to 0.5 ps/km/nm (at 1559 nm). In addition, the amount of frequency shift is set equal to 320 MHz (twice as much as the first embodiment), and the direction of the frequency shift is inverted at a center of the system.

Figure 8:
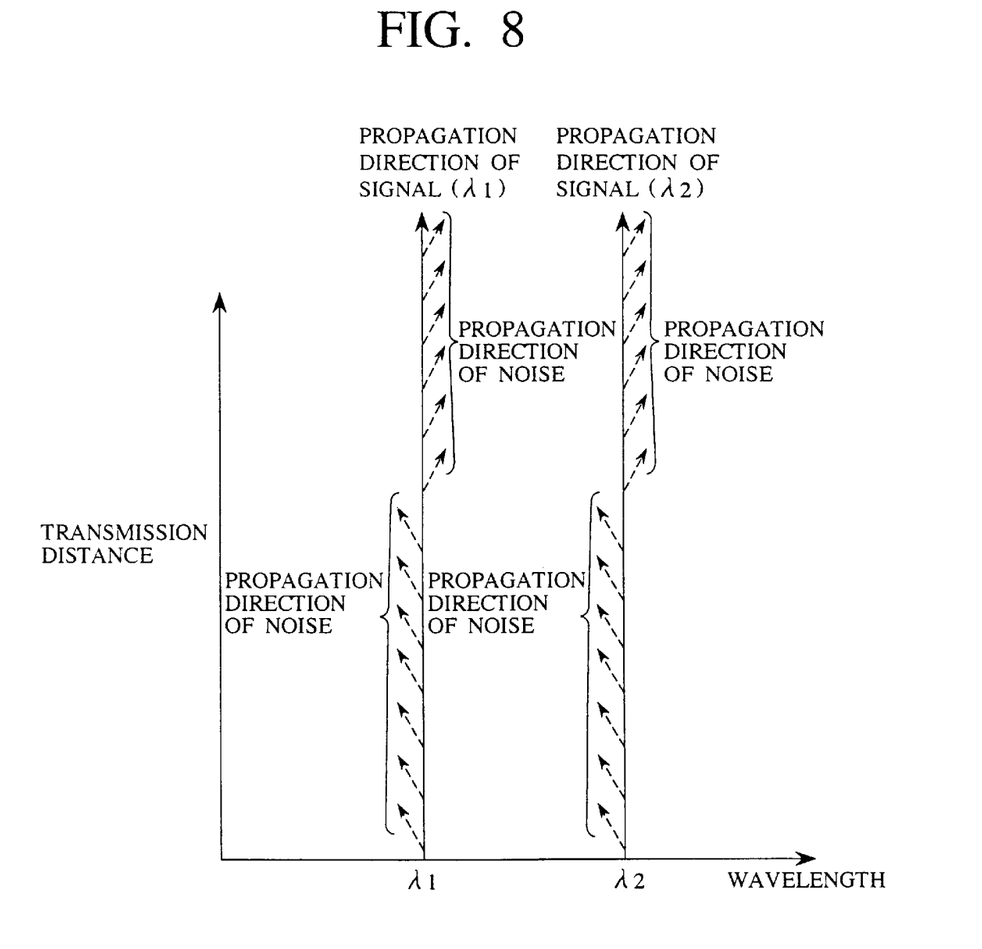
FIG. 8 is a diagram showing propagation direction of signal components and noise components in the second embodiment of an optical soliton transmission system according to the present invention.

In the first embodiment, the noises are propagated into a single direction, so that the noises can be introduced into the bandwidth of the adjacent channel when the amount of frequency shift is increased, and for this reason the optimal (larger) frequency shift cannot be given. In contrast, in this second embodiment, the propagation direction of the noise components at each optical amplifier repeater is inverted at a center of the system as shown in FIG. 8, so that it is possible to give the optimum frequency shift and it becomes possible to realize the transmission over 10,000 km or more as a result of the further improved transmission characteristic.

Figure 9:
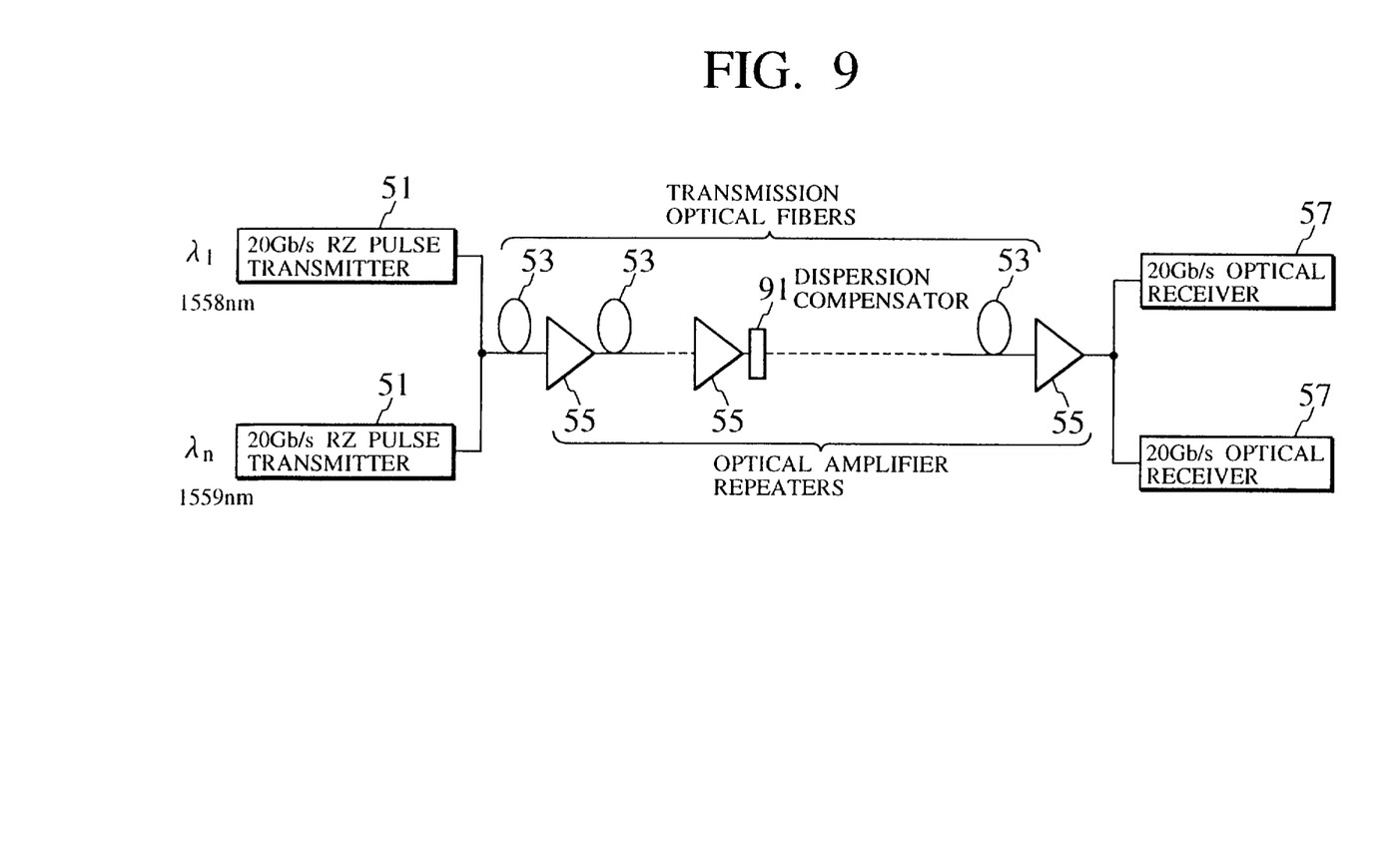
FIG. 9 is a block diagram showing a configuration of the third embodiment of an optical soliton-like RZ pulse transmission system according to the present invention.

Next, FIG. 9 shows the third embodiment of the optical soliton-like RZ pulse transmission system according to the present invention.

In this third embodiment of FIG. 9, the soliton transmitters of FIG. 4 are replaced by RZ pulse transmitters 51, while a number of the RZ pulse transmitters 51 is set equal to two, the bit rate is set equal to 20 Gb/s, a pulse width (a full width at half maximum) of the transmission pulse is set equal to 10 ps, and the wavelengths of the transmitter outputs are set equal to 1558 and 1559 nm. Then, the output level of the optical amplifier repeater 55 is set equal to 3 dBm, the repeater interval is set equal to 30 km, and the amount of frequency shift by the optical frequency shifter provided in each optical amplifier repeater is set equal to −160 MHz similarly as in the first embodiment. Also, the optical fiber wavelength dispersion (an average value over the entire system) is set equal to 0.5 ps/km/nm (at 1559 nm), and the optical fiber wavelength dispersion slope is set equal to 0.07 ps/km/nm$^2$.

In addition, a dispersion compensator 91 formed by the dispersion compensation fiber having a normal dispersion of −60 ps/nm is inserted at every five repeaters (every 150 km), so as to cancel out the accumulated wavelength dispersion over five repeaters (+64.5 ps/nm at 1558 nm and +75 ps/nm at 1559 nm).

With this setting, the influence of the Gordon Haus jitter due to the accumulated dispersion can be reduced considerably, and the error rate below $10^{-9}$ can be achieved after the transmission over 9000 km even when the transmission rate per wavelength is raised up to 20 Gb/s.

Thus, according to this third embodiment, it is possible to realize a sufficiently good transmission characteristic by using a smaller amount of frequency shift.

Figure 10:
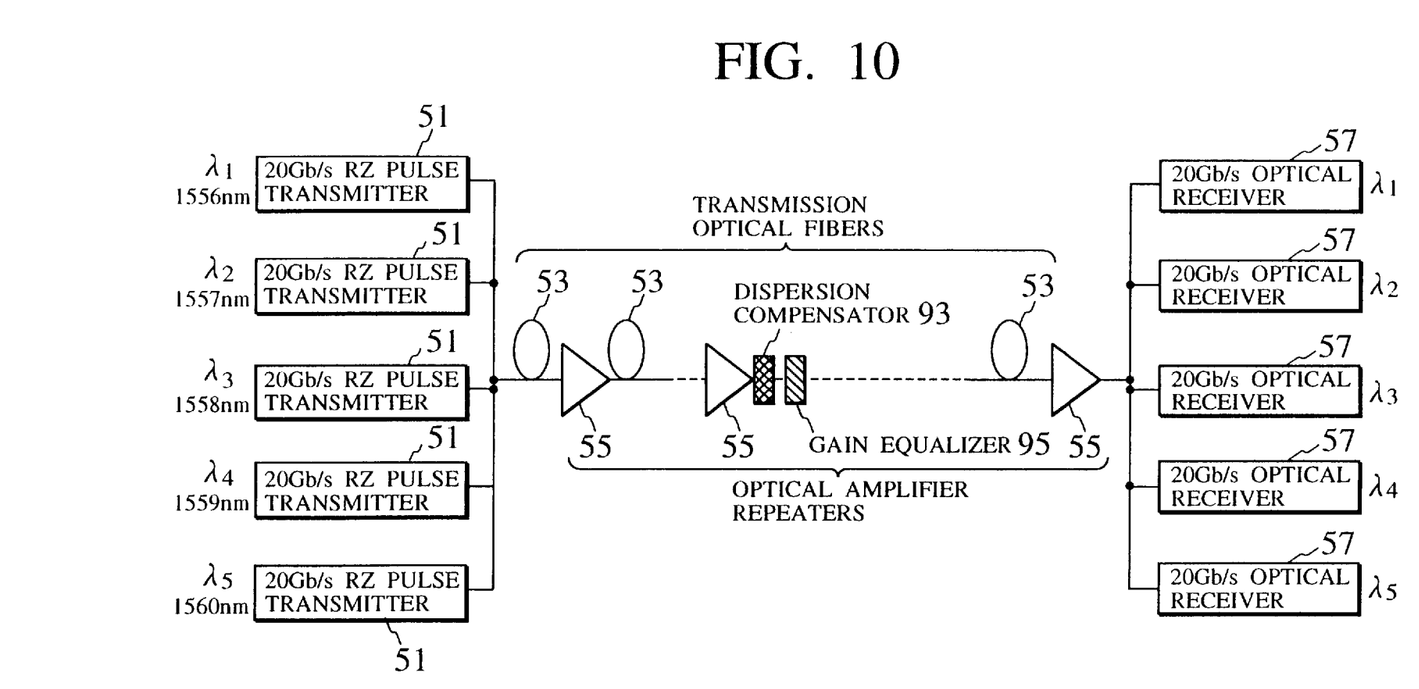
FIG. 10 is a block diagram showing a configuration of the fourth embodiment of an optical soliton-like RZ pulse transmission system according to the present invention.

Next, FIG. 10 shows the fourth embodiment of the optical soliton-like RZ pulse transmission system according to the present invention.

In this fourth embodiment of FIG. 10, the soliton transmitters of FIG. 4 are replaced by RZ pulse transmitters 51, while a number of the RZ pulse transmitters 51 is set equal to five, the bit rate is set equal to 20 Gb/s, a pulse width (a full width at half maximum) of the transmission pulse is set equal to 10 ps, and the wavelengths of the transmitter outputs are set equal to 1556, 1557, 1558, 1559 and 1560 nm respectively. Then, the output level of the optical amplifier repeater 55 is set equal to 7 dBm, the repeater interval is set equal to 30 km, and the amount of frequency shift by the optical frequency shifter provided in each optical amplifier repeater is set equal to −160 MHz similarly as in the first embodiment. Also, the optical fiber wavelength dispersion (an average value over the entire system) is set equal to 0.5 ps/km/nm (at 1559 nm), and the optical fiber wavelength dispersion slope is set equal to 0.07 ps/km/nm$^2$.

In addition, a dispersion slope compensator 93 having a wavelength dispersion of −60 ps/nm (at 1558 nm) and a dispersion slope of −10.5 ps/nm$^2$ is inserted at every five repeaters (every 150 km), so that the wavelength dispersion slope of the transmission optical fibers is compensated and the accumulated wavelength dispersion over five repeaters is made equal to +4.5 ps/nm for all wavelengths. The dispersion slope compensator 93 is realized by using the chirped fiber grating in this fourth embodiment.

Furthermore, in order to prevent the decrease of the gain bandwidth due to the multiple connection of the optical amplifier repeaters, a gain equalizer 95 having a characteristic which is an inverse of the gain characteristic (the wavelength characteristic) is inserted at every five repeaters.

With this configuration of FIG. 10, the accumulated wavelength dispersion is sufficiently small at all the wavelengths, so that the influence of the Gordon Haus jitter due to the accumulated dispersion can be reduced considerably.

In addition, at a time of the wavelength multiplexing transmission of a plurality of wavelengths, there has been a problem that the frequency variation that can be caused when signals of different wavelengths collide with each other during the transmission will become the timing jitter at a receiving terminal. However, in this configuration of FIG. 10, the absolute value of the dispersion is sufficiently small so that the frequency variation is not transformed into the timing jitter, and the error rate below $10_{-9}$ can be achieved after the transmission over 9000 km for all the signal wavelengths, so that it becomes possible to enlarge the total transmission capacity considerably.

Moreover, in this configuration of FIG. 10, it is also possible to handle wavelengths which are more numerous than five as described above.

Thus, according to this fourth embodiment, the accumulated wavelength dispersion that can cause the timing jitter is sufficiently small for all the wavelengths, so that it is possible to realize a highly desirable transmission characteristic in which there is no degradation of the transmission characteristic due to the Gordon Haus jitter, and there is hardly any influence of the timing jitter that can be caused when signals of different wavelengths collide with each other during the transmission.

Note that the first to fourth embodiments of the optical soliton-like RZ pulse transmission system described above have been directed to a case of providing the optical amplifier repeater having the optical frequency shifter of the present invention in every section of the transmission optical fibers, but the present invention is not necessarily limited to such a case alone, and it is possible to modify these embodiments to provide at least one such optical amplifier repeater having the optical frequency shifter of the present invention in at least one section of the transmission optical fibers.

Similarly, in the third embodiment of the optical soliton-like RZ pulse transmission system described above, it is not absolutely necessary to provide the dispersion compensator 91 at every section of the transmission optical fibers, and it suffices to provide the dispersion compensator 91 in at least each section of the transmission optical fibers other than the last section.

Similarly, in the fourth embodiment of the optical soliton-like RZ pulse transmission system described above, it is not absolutely necessary to provide the dispersion slope compensator 93 and the gain equalizer 95 at every section of the transmission optical fibers, and it suffices to provide the dispersion slope compensator 93 and the gain equalizer 95 in at least each section of the transmission optical fibers other than the last section.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical frequency shifter, comprising:

a ultrasonic wave generator for generating ultrasonic waves;

an electric acousto-optic element forming a diffraction grating therein upon being applied with the ultrasonic waves generated by the ultrasonic wave generator;

an input light path for entering an input light into the electric acousto-optic element at a Bragg angle of the diffraction grating in a prescribed direction side, the prescribed direction being defined as either identical or opposite to a propagation direction of the ultrasonic waves;

a polarization rotator for rotating a polarization plane of a first primary diffracted light produced by the diffraction grating from the input light, by 90°;

a reflection mechanism for entering a polarization plane rotated light produced by the polarization rotator into the electric acousto-optic element at a Bragg angle of the diffraction grating in the prescribed direction side; and an output light path for outputting a second primary diffracted light produced by the diffraction grating from the polarization plane rotated light, as an output light.

2. The optical frequency shifter of claim 1, wherein the polarization rotator is a Faraday rotator for rotating the polarization plane of a light passing therein by 90°, and the first primary diffracted light is directed to pass through the Faraday rotator once.

3. The optical frequency shifter of claim 2, wherein the reflection mechanism includes:

a mirror for totally reflecting the first primary diffracted light toward the Faraday rotator, so that the first primary diffracted light passes through the Faraday rotator once and the polarization plane rotated light is propagated toward the electric acousto-optic element and entered into the electric acousto-optic element at a Bragg angle of the diffraction grating in the prescribed direction.

4. The optical frequency shifter of claim 1, wherein the polarization rotator is a Faraday rotator for rotating the polarization plane of a light passing therein by 45°, and the first primary diffracted light is directed to pass through the Faraday rotator twice.

5. The optical frequency shifter of claim 4, wherein the Faraday rotator is located between the electric acousto-optic element and the reflection mechanism and the first primary diffracted light produced by the diffraction grating from the input light is directed to the Faraday rotator, and the reflection mechanism includes:

a mirror for totally reflecting the first primary diffracted light which passed through the Faraday rotator once toward the Faraday rotator, so that the first primary diffracted light passes through the Faraday rotator twice and the polarization plane rotated light produced by passing through the Faraday rotator twice is entered into the electric acousto-optic element at a Bragg angle of the diffraction grating in a second direction.

6. An optical frequency shifter, comprising:

a first ultrasonic wave generator for generating ultrasonic waves;

a first electric acousto-optic element forming a first diffraction grating therein upon being applied with the ultrasonic waves generated by the first ultrasonic wave generator;

an input light path for entering an input light into the first electric acousto-optic element at a Bragg angle of the first diffraction grating in a prescribed direction side with respect to the ultrasonic waves generated by the first ultrasonic wave generator, the prescribed direction being defined as either identical or opposite to a propagation direction of the ultrasonic waves;

a polarization rotator for rotating a polarization plane of a first primary diffracted light produced by the first diffraction grating from the input light, by 90°;

a second ultrasonic wave generator for generating ultrasonic waves;

a second electric acousto-optic element forming a second diffraction grating therein upon being applied with the ultrasonic waves generated by the second ultrasonic wave generator, into which a polarization plane rotated light produced by the polarization rotator is entered at a Bragg angle of the second diffraction grating in the prescribed direction side with respect to the ultrasonic waves generated by the second ultrasonic wave generator; and an output light path for outputting a second primary diffracted light produced by the second diffraction grating from the polarization plane rotated light, as an output light.

7. The optical frequency shifter of claim 6, wherein the polarization rotator is a Faraday rotator for rotating the polarization plane of a light passing through the Faraday rotator by 90°, which is located between the first electric acousto-optic element and the second electric acousto-optic element.

8. An optical frequency shifter, comprising:

at least one ultrasonic wave generator for generating ultrasonic waves;

at least one electric acousto-optic element forming at least one diffraction grating therein upon being applied with the ultrasonic waves generated by said at least one ultrasonic wave generator;

at least one polarization rotator for rotating a polarization plane of a first primary diffracted light produced by said at least one diffraction grating, by 90°; and a light path through which an input light is entered into said at least one electric acousto-optic element at a Bragg angle of said at least one diffraction grating in a prescribed direction side, the prescribed direction being defined as either identical or opposite to a propagation direction of the ultrasonic waves, so that the first primary diffracted light is produced by said at least one diffraction grating from the input light, a polarization plane rotated light produced by said at least one polarization rotator is entered into said at least one electric acousto-optic element at a Bragg angle of said at least one diffraction grating in the prescribed direction side, and a second primary diffracted light produced by said at least one diffraction grating from the polarization plane rotated light is outputted as an output light.

9. An optical soliton-like return-to-zero pulse transmission system for transmitting wavelength multiplexed optical soliton-like return-to-zero pulses; comprising:

a plurality of return-to-zero pulse transmitters for generating optical soliton-like return-to-zero pulses in a plurality of different wavelengths;

transmission optical fibers for transmitting the optical soliton-like return-to-zero pulses generated by the return-to-zero pulse transmitters;

a plurality of optical receivers for receiving the optical soliton-like return-to-zero pulses transmitted through the transmission optical fibers; and a plurality of optical amplifier repeaters to be inserted into the transmission optical fibers at a prescribed repeater interval, for compensating a loss of the transmission optical fibers, at least one optical amplifier repeater including:

a fixed optical filter having a prescribed light transmission characteristic with respect to said plurality of different wavelengths, which is provided at an output side of said at least one optical amplifier repeater; and an optical frequency shifter having no insertion loss polarization dependency and no polarization mode dispersion, which is provided at an input side of the fixed optical filter.

10. The system of claim 9, wherein the optical frequency shifter includes:

an ultrasonic wave generator for generating ultrasonic waves;

an electric acousto-optic element forming a diffraction grating therein upon being applied with the ultrasonic waves generated by the ultrasonic wave generator;

an input light path for entering an input light into the electric acousto-optic element at a Bragg angle of the diffraction grating in a prescribed direction side, the prescribed direction being defined as either identical or opposite to a propagation direction of the ultrasonic waves;

a polarization rotator for rotating a polarization plane of a first primary diffracted light produced by the diffraction grating from the input light, by 90°;

a reflection mechanism for entering a polarization plane rotated light produced by the polarization rotator into the electric acousto-optic element at a Bragg angle of the diffraction grating in the prescribed direction side; and an output light path for outputting a second primary diffracted light produced by the diffraction grating from the polarization plane rotated light, as an output light.

11. The system of claim 10, wherein the polarization rotator is a Faraday rotator for rotating the polarization plane of a light passing therein by 90°, and the first primary diffracted light is directed to pass through the Faraday rotator once.

12. The system of claim 11, wherein the reflection mechanism includes:

a mirror for totally reflecting the first primary diffracted light toward the Faraday rotator, so that the first primary diffracted light passes through the Faraday rotator once and the polarization plane rotated light is propagated toward the electric acousto-optic element and entered into the electric acousto-optic element at a Bragg angle of the diffraction grating in the prescribed direction.

13. The system of claim 10, wherein the polarization rotator is a Faraday rotator for rotating the polarization plane of a light passing therein by 45°, and the first primary diffracted light is directed to pass through the Faraday rotator twice.

14. The system of claim 13, wherein the Faraday rotator is located between the electric acousto-optic element and the reflection mechanism and the first primary diffracted light produced by the diffraction grating from the input light is directed to the Faraday rotator, and the reflection mechanism includes:

a mirror for totally reflecting the first primary diffracted light which passed through the Faraday rotator once toward the Faraday rotator, so that the first primary diffracted light passes through the Faraday rotator twice and the polarization plane rotated light produced by passing through the Faraday rotator twice is entered into the electric acousto-optic element at a Bragg angle of the diffraction grating in the second direction.

15. The system of claim 9, wherein the optical frequency shifter includes:

a first ultrasonic wave generator for generating ultrasonic waves;

a first electric acousto-optic element forming a first diffraction grating therein upon being applied with the ultrasonic waves generated by the first ultrasonic wave generator;

an input light path for entering an input light into the first electric acousto-optic element at a Bragg angle of the first diffraction grating in a prescribed direction side with respect to the ultrasonic waves generated by the first ultrasonic wave generator, the prescribed direction being defined as either identical or opposite to a propagation direction of the ultrasonic waves;

a polarization rotator for rotating a polarization plane of a first primary diffracted light produced by the first diffraction grating from the input light, by 90°;

a second ultrasonic wave generator for generating ultrasonic waves;

a second electric acousto-optic element forming a second diffraction grating therein upon being applied with the ultrasonic waves generated by the second ultrasonic wave generator, into which a polarization plane rotated light produced by the polarization rotator is entered at a Bragg angle of the second diffraction grating in the prescribed direction side with respect to the ultrasonic waves generated by the second ultrasonic wave generator; and an output light path for outputting a second primary diffracted light produced by the second diffraction grating from the polarization plane rotated light, as an output light.

16. The system of claim 15, wherein the polarization rotator is a Faraday rotator for rotating the polarization plane of a light passing through the Faraday rotator by 90°, which is located between the first electric acousto-optic element and the second electric acousto-optic element.

17. The system of claim 9, wherein the optical frequency shifter includes:

at least one ultrasonic wave generator for generating ultrasonic waves;

at least one electric acousto-optic element forming at least one diffraction grating therein upon being applied with the ultrasonic waves generated by said at least one ultrasonic wave generator;

at least one polarization rotator for rotating a polarization plane of a first primary diffracted light produced by said at least one diffraction grating, by 90°; and a light path through which an input light is entered into said at least one electric acousto-optic element at a Bragg angle of said at least one diffraction grating in a prescribed direction side, the prescribed direction being defined as either identical or opposite to a propagation direction of the ultrasonic waves, so that the first primary diffracted light is produced by said at least one diffraction grating from the input light, a polarization plane rotated light produced by said at least one polarization rotator is entered into said at least one electric acousto-optic element at a Bragg angle of said at least one diffraction grating in the prescribed direction side, and a second primary diffracted light produced by said at least one diffraction grating from the polarization plane rotated light is outputted as an output light.

18. The system of claim 9, wherein said at least one optical amplifier repeater further includes:

an erbium-doped optical fiber provided at an input side of said at least one optical amplifier repeater;

a wavelength division multiplexing coupler coupled to the erbium-doped optical fiber;

a pumping light source connected with the wavelength division multiplexing coupler, for amplifying a light signal propagating through the erbium-doped optical fiber by supplying a pumping light into the erbium-doped optical fiber through the wavelength division multiplexing coupler; and an optical isolator connected to the wavelength division multiplexing coupler, for blocking a reflected light from an output side of said at least one optical amplifier repeater.

19. The system of claim 9, wherein there are more than one optical amplifier repeaters each of which includes the optical frequency shifter, and a direction of frequency shift is inverted at a center of the system among a plurality of optical frequency shifters included in said more than one optical amplifier repeaters.

20. The system of claim 9, wherein the transmission optical fibers have an accumulated wavelength dispersion value which globally increases through the transmission optical fibers, the transmission optical fibers are divided into a plurality of sections, and the system further comprises:

a wavelength dispersion medium provided in at least each section of the transmission optical fibers other than a last section, for locally compensating the accumulated wavelength dispersion value within each section.

21. The system of claim 20, wherein the wavelength dispersion medium is a dispersion compensation optical fiber.

22. The system of claim 9, wherein the transmission optical fibers have accumulated wavelength dispersion values for different wavelengths which globally increase through the transmission optical fibers, the transmission optical fibers are divided into a plurality of sections, and the system further comprises:

a dispersion slope compensation device provided in at least each section of the transmission optical fibers other than a last section, for compensating a dispersion slope of the transmission optical fibers within each section, so as to set the accumulated wavelength dispersion values for different wavelengths substantially uniform.

23. The system of claim 22, wherein the dispersion slope compensation device is a chirped fiber grating.

24. The system of claim 9, wherein the transmission optical fibers are divided into a plurality of sections, and the system further comprises:

a gain equalizer provided in at least each section of the transmission optical fibers other than a last section, for preventing a decrease of a gain bandwidth within each section.

* * * * *